No. 629,872. Patented Aug. 1, 1899.
J. T. ROBSON.
ELECTRIC MOTOR.
(Application filed Nov. 10, 1898.)
(No Model.)
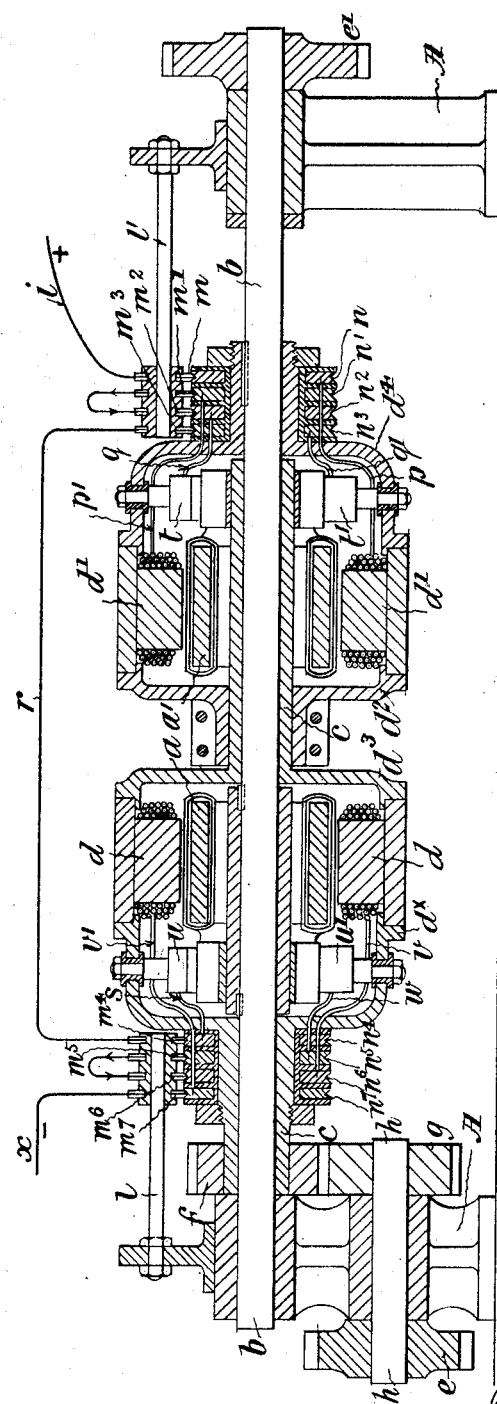
Inventor,
James Thomas Robson.

UNITED STATES PATENT OFFICE.

JAMES THOMAS ROBSON, OF LONDON, ENGLAND, ASSIGNOR OF TWO-THIRDS TO CHARLES HENRY MARSDEN AND HENRY WILLIAM HEADLAND, OF SAME PLACE.

ELECTRIC MOTOR.

SPECIFICATION forming part of Letters Patent No. 629,872, dated August 1, 1899.

Application filed November 10, 1898. Serial No. 696,059. (No model.)

*To all whom it may concern:*

Be it known that I, JAMES THOMAS ROBSON, a subject of the Queen of Great Britain and Ireland, residing at London, England, have invented certain new and useful Improvements in Electromotors, (for which I have obtained Letters Patent in Great Britain, dated the 20th day of April, 1898, No. 9,178;) and I do declare the following to be a full, clear, and exact description of the invention, such as will enable others skilled in the art to which it appertains to make and use the same, reference being had to the accompanying drawing, and to letters of reference marked thereon, which forms a part of this application.

These improvements relate to electromotors in which the armature rotates in one direction and the casing or frame containing the field-magnets rotates in the opposite direction and both drive the shaft.

The accompanying drawing is a longitudinal section of the motor constructed according to my invention, wherein the rotating parts balance each other's centrifugal forces at all speeds.

I arrange two such electromotors on the same shaft, and for this purpose the armature of one motor is connected mechanically to the field-magnet casing surrounding the other.

I have shown the motor operatively mounted in a framing A. However any other framing or suspension may be used to conform with the character of device to which power is to be supplied. In this framing is supported the shaft $b$. The armature $a$ of one motor is fixed on the shaft $b$, which passes through a hollow shaft or sleeve $c$, upon which the armature $a'$ of the other motor is keyed, and the field-magnet casing $d^2 d^4$ around the said armature $a'$ is also keyed to the shaft $b$. Upon the end of the shaft $b$ is shown, as an example, a sprocket-wheel $e'$ for transmitting the power, and upon the outer end of the sleeve $c$ or hollow shaft is shown a spur-wheel $f$, which gears with a spur-wheel $g$ upon another shaft $h$, journaled in the framing A. A second sprocket-wheel $e$, secured to the shaft $h$, serves for transmitting the power. Both of these sprocket-wheels $e$ and $e'$ will thus be rotated in the same direction. The part $d^2$ of the casing is made in halves bolted together. The casing for the motors $d^2 d^\times$ and $d^2 d^4$ may be made of open-work or may be closed dust-proof. For driving by spur wheel-gearing instead of by sprocket wheels and chains I may fit a spur-wheel on one end of the shaft and another spur-wheel on a sleeve at the other end, one such wheel to gear with an outside spur-wheel and the other with an inside spur-wheel. The current may be supplied in the manner indicated.

The wire $i$ leads from the battery to the outer end of one motor and the wire $x$ from the outer end of the other motor back to the battery. On studs $l$ and $l'$, suitably fastened to the framing A, are carried four brushes $m\ m'\ m^2\ m^3$ and $m^4\ m^5\ m^6\ m^7$, which engage with rings $n\ n'\ n^2\ n^3$ and $n^4\ n^5\ n^6\ n^7$, that rotate with the motors. These brushes are insulated from the studs and from each other. Other brushes $u$ and $t$ and $u'$ and $t'$ are fixed to but isulated from the interior of the field-magnet casing $d^\times$ and $d^4$ and connected by insulated wires to the various parts. The current thus runs from battery-wire $i$ to brush $m$, collecting-ring $n$, wire $p$, field-magnets $d'$, wire $p'$, ring $n'$, brush $m'$, brush $m^2$, ring $n^2$, wire $q$, brush $t$, armature $a'$, brush $t'$, wire $q'$, ring $n^3$, brush $m^3$, wire $r$, brush $m^4$, ring $n^4$, wire $s$, brush $u$, armature $a$, brush $u'$, wire $w$, ring $n^5$, brush $m^5$, brush $m^6$, ring $n^6$, wire $v$, field-magnets $d$, wire $v'$, ring $n^4$, brush $m^7$, and wire $x$ to battery.

The two motors are connected in series; but by changing the connecting-wires to the brushes of the collecting-rings two armatures may be put in series and two fields in parallel or the two armatures in parallel and the two fields in series, and the sequence of connections to armature and field-magnets may be either field-magnet, armature, field-magnet, and armature, or field-magnet armature, armature, and field-magnet. By the means described I am enabled to reverse the current and the rotary motion of the motor. By the arrangement described the rotating parts may be made to balance their centrifugal forces at all speeds.

As applied to motor-cars the arrangement shown and described is of great practical utility, because no special differential gear is needed for enabling the motor-car to turn a corner, inasmuch as the armature of one motor and the field-magnets of the other motor automatically slow down together to the required speed, while allowing the other armature and field-magnets to run together at their full or required speed.

For driving two propellers (right and left hand) in opposite directions in the same axis without employing wheel-gearing I omit the wheels $e'$, $f$, $g$, and $e$ and fit one propeller on the prolonged end of the shaft $b$ and the other propeller on the prolongation of the sleeve $c$.

Having thus described my invention, what I claim, and desire to secure by Letters Patent, is—

1. A combined or double motor consisting of two electromotors mounted on the same shaft, the armature of each motor being connected with the set of field-magnets of the other motor to rotate therewith, the two armatures rotating in opposite directions and the two sets of field-magnets also rotating in opposite directions, substantially as set forth.

2. A combined or double motor consisting of two electromotors mounted on the same shaft, the armature of one and the set of field-magnets of the other being fixed to the shaft, while the set of field-magnets of the former, and the armature of the other are provided with a sleeve which rotates on and in the opposite direction to that of the shaft, substantially as set forth.

3. A combined or double motor consisting of two electromotors mounted on the same shaft, the armature of one and the set of field-magnets of the other fixed to the shaft, the set of field-magnets of the former, and the armature of the other provided with a sleeve which rotates on and in the opposite direction to that of the shaft, four rings insulated from each other on the shaft at each end of the double motor, two brushes against two rings of each set of rings connected with the armature-coil ends and two brushes against the other two rings of each set of rings connected to the ends of the magnet-coils, substantially as set forth.

In testimony that I claim the foregoing as my invention I have signed my name, in presence of two subscribing witnesses, at London, England, November 1, 1898.

JAMES THOMAS ROBSON.

Witnesses:
 V. JENSEN,
 WALTER JAMES SKERTEN.